UNITED STATES PATENT OFFICE.

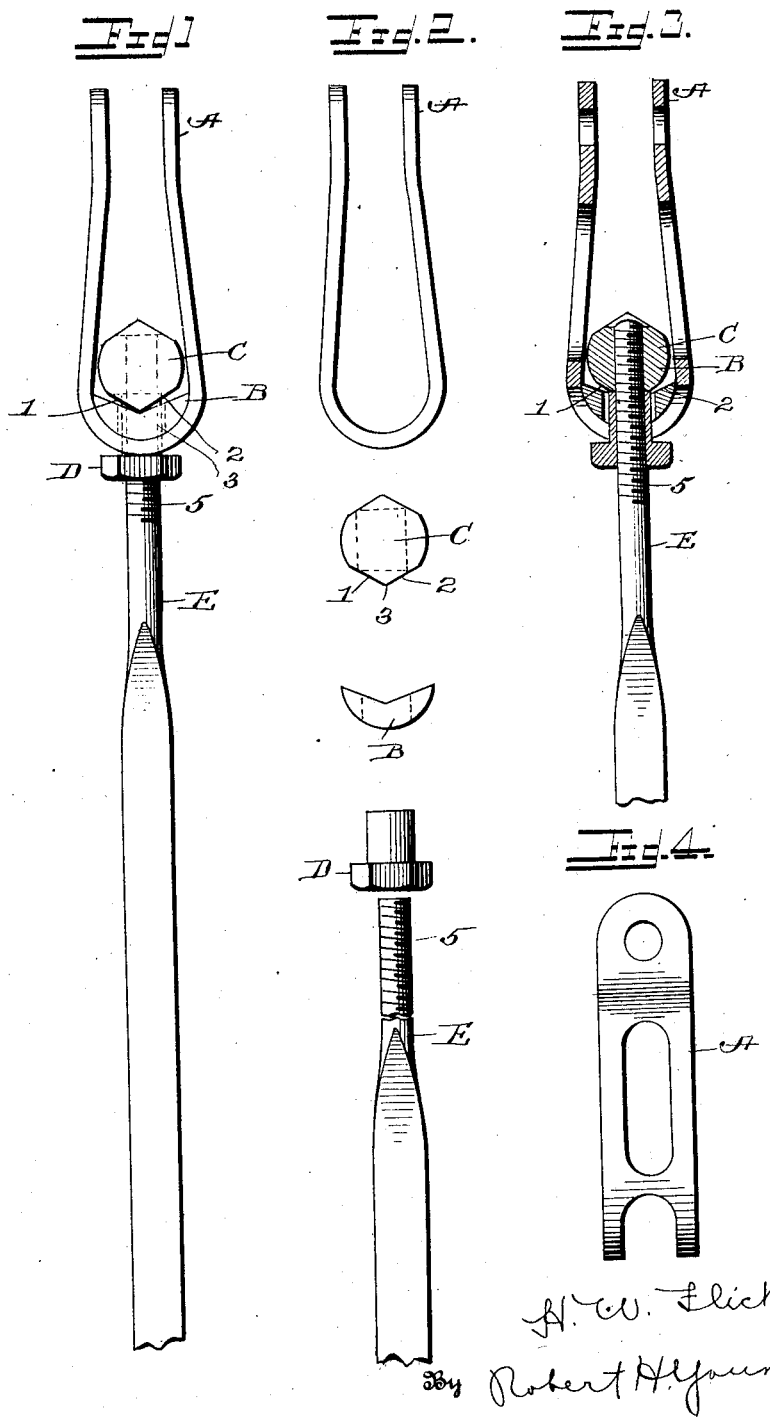

HARRISON W. FLICKINGER, OF DAYTON, OHIO.

GUY-WIRE FITTING.

1,405,828.  Specification of Letters Patent.  Patented Feb. 7, 1922.

Application filed May 5, 1921. Serial No. 467,127.

*To all whom it may concern:*

Be it known that I, HARRISON W. FLICKINGER, a citizen of the United States, residing at Dayton, in the county of Montgomery and State of Ohio, have invented certain new and useful Improvements in Guy-Wire Fittings, of which the following is a specification.

This invention relates to a wire fitting such as is adapted for use for fitting the wires, as necessary, to the fuselage, wing and strut portions of the airplane.

Where it has been proposed to use spun wire or "streamline tape" as the necessary wires in the truss work of aircraft structure and rigging, considerable difficulty has been experienced in that such wires easily crystallize due to the vibration to which they are subjected, with the result that the wires break after a comparatively short period of use. This, of course, results in an extra strain on the remaining unbroken wires with their possible failure and frequently causes a crash of the aircraft.

The vibration of such a streamline tape wire takes place in a plane perpendicular to the airstream and hence at right angles to the plane of the tape. The failure of such a wire has, in almost every case, taken place at the shank where the wire joins the fitting, or rather at the point where the vibrating wire joins the fixed or stationary portion of the fitting. Such a point then, is a point of the wire which is subjected to the maximum of metallic strain during the vibration of the wire, and it is the object of this invention to provide a means whereby the strain may be to a considerable degree obviated, if not entirely overcome.

The object of this invention is to provide a fitting which will permit a small degree of movement caused by the usual vibration of such wires, but which will provide a bearing surface for the wire retaining means, such as will prevent the crystallization of the shanking of the wire incident to such vibration.

A complete description of my invention will be found in the accompanying specification and drawings, in which:

Figure 1 is a side elevation of a portion of such a wire provided with a fitting embodying features of my invention, the whole being assembled;

Figure 2 is a view of the same unassembled;

Figure 3 is a central cross section of Figure 1; and

Figure 4 is a side elevation of the U-shaped fitting.

Referring to the drawings in detail, A is a fixed portion of the fitting which is to be normally attached by the usual well known means to the body, struts or wings of the aircraft, as the case may be. A is a U-shaped fitting and is adapted to receive a bearing portion B rounded or shaped to coincide to its inner surface of the U-shaped fitting B as shown in Figure 1. The bearing member B is provided at its upper surface, as shown in Figs. 1, 2, and 3, with two plain faces 1 and 2 as shown to provide a seat for the knife edge 3 of the wire retaining nut C. B and C are heat treated to increase the hardness of the metal of which they are composed. As is shown in the drawings the wire retaining nut C is provided with a knife edge 3 formed by its two lower faces meeting at an angle less obtuse than that of the two faces of the bearing B to provide the necessary play incident to the vibration of the wire. Wire retaining nut C is interiorly screw-threaded as shown in Fig. 3 for the reception of the shank E of the wire, said shank being screw-threaded as shown at 5. A lock nut D is provided to assist in preventing any undesired rotation of the wire E.

From the foregoing the operation of my invention will be seen to be as follows:

The shank of the wire E, when the wire and fitting are assembled, is inserted into the wire retaining nut C and the wire is rotated until the proper tension is obtained. The wire then will be rigidly attached to the wire retaining nut C so that vibrations of the wire instead of causing a strain in the shank will be transmitted to the wire retaining nut C, which is free to move on its knife edge and knife edge bearing with a minimum amount of resistance, and a consequent amount of metallic strain in the wire itself.

I claim:

1. The combination, in a device for fitting a wire to a body, means adapted to be rigidly attached to said body, wire retaining means adapted to be fixedly attached to the wire, said wire retaining means being provided with a knife edge bearing for the purpose described.

2. The combination, in a device for fitting a wire to a body, means adapted to be rigidly attached to said body, wire retaining means adapted to be fixedly attached to the wire, said wire retaining means being provided with a knife edge bearing, and means between said fixed fitting and said wire retaining means for providing a seat for said knife edge bearing.

In testimony whereof I have affixed my signature.

HARRISON W. FLICKINGER.